(12) United States Patent
Livne et al.

(10) Patent No.: US 9,042,220 B2
(45) Date of Patent: May 26, 2015

(54) NETWORK TRAFFIC SCHEDULER AND ASSOCIATED METHOD, COMPUTER PROGRAM AND COMPUTER PROGRAM PRODUCT

(75) Inventors: Sarig Livne, Ramat Gan (IL); Vitaly Sukonik, Katzir (IL); Einat Ophir, Telmond (IL)

(73) Assignee: MARVELL WORLD TRADE LTD., St. Michael (BB)

( * ) Notice: Subject to any disclaimer, the term of this patent is extended or adjusted under 35 U.S.C. 154(b) by 254 days.

(21) Appl. No.: 13/475,445

(22) Filed: May 18, 2012

(65) Prior Publication Data

US 2012/0294317 A1 Nov. 22, 2012

Related U.S. Application Data

(60) Provisional application No. 61/487,518, filed on May 18, 2011.

(30) Foreign Application Priority Data

May 18, 2011 (EP) ..................................... 11166496

(51) Int. Cl.
*H04L 12/26* (2006.01)
*H04L 12/869* (2013.01)
*H04L 12/863* (2013.01)
(Continued)

(52) U.S. Cl.
CPC ................ *H04L 47/60* (2013.01); *H04L 47/58* (2013.01); *H04L 47/6215* (2013.01); *H04L 49/206* (2013.01); *H04L 49/254* (2013.01); *H04L 49/90* (2013.01)

(58) Field of Classification Search
USPC ................................... 370/229–236, 351–429
See application file for complete search history.

(56) References Cited

U.S. PATENT DOCUMENTS 6,487,213 B1 11/2002 Chao
6,667,984 B1 * 12/2003 Chao et al. .................... 370/414
(Continued)

FOREIGN PATENT DOCUMENTS

WO   WO 2009130218 A1 * 10/2009

OTHER PUBLICATIONS

International Search Report and Written Opinion of International Searching Authority, mailed Aug. 3, 2012 in counterpart International Application No. PCT/IB2012/001149.
(Continued)

*Primary Examiner* — Kwang B Yao
*Assistant Examiner* — Juvena Loo

(57) ABSTRACT

Aspects of the disclosure provide a method for network traffic scheduling. The method includes selecting, at a present node within a node hierarchy that multiplexes a plurality of input nodes to an output node, a winning node from a plurality of lower level nodes, obtaining first parameters provided from the winning node, the first parameters being in association with the winning node, determining second parameters in association with the present node at least partially based on the first parameters, and providing the second parameters in association with the present node to an upper level node in the node hierarchy for scheduling at the upper level node. To determine the second parameters in association with the present node, in an embodiment, the method includes using the first parameters to look up an entry in a lookup table that stores the second parameters in association with the first parameters.

23 Claims, 4 Drawing Sheets

(51) Int. Cl.
*H04L 12/931* (2013.01)
*H04L 12/937* (2013.01)
*H04L 12/861* (2013.01)

(56) References Cited

U.S. PATENT DOCUMENTS

| | | | |
|---|---|---|---|
| 6,901,074 B1 * | 5/2005 | Yamasaki | 370/400 |
| 7,460,544 B2 * | 12/2008 | Jain et al. | 370/395.4 |
| 7,969,884 B1 * | 6/2011 | Venables et al. | 370/235 |
| 8,027,346 B1 * | 9/2011 | Venables et al. | 370/394 |
| 8,040,821 B2 * | 10/2011 | Higuchi et al. | 370/254 |
| 2005/0074011 A1 * | 4/2005 | Robotham et al. | 370/395.4 |
| 2007/0153697 A1 * | 7/2007 | Kwan et al. | 370/235 |
| 2010/0091783 A1 * | 4/2010 | Venables | 370/412 |
| 2010/0278190 A1 * | 11/2010 | Yip et al. | 370/412 |
| 2011/0158249 A1 * | 6/2011 | Basso et al. | 370/412 |

OTHER PUBLICATIONS

Office Action issued on Nov. 26, 2012 in corresponding European Application No. 11166496.7.

\* cited by examiner ns of the lower level nodes. In another example, the method includes determining the second parameters in association with the present node based on the first parameters and internal parameters of the present node. In another example, the method includes determining the second parameters in association with the present node based on the first parameters and a minimum token bucket parameter and a maximum token bucket parameter of the present node.

NETWORK TRAFFIC SCHEDULER AND ASSOCIATED METHOD, COMPUTER PROGRAM AND COMPUTER PROGRAM PRODUCT

INCORPORATION BY REFERENCE

This present disclosure claims the benefit of U.S. Provisional Application No. 61/487,518, "Network Traffic Scheduler and Associated Method, Computer Program and Computer Program Product," filed on May 18, 2011, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In traffic scheduling for communications networks, traffic from a large number of inputs often needs to be multiplexed to an output. Further, in an example, users in association with the inputs may respectively sign up service agreements that specify respective bandwidth, delay and jitter. The traffic scheduling then needs to be configured to make user experiences satisfy the service agreements.

SUMMARY

Aspects of the disclosure provide a method for network traffic scheduling. The method includes selecting, at a present node within a node hierarchy that multiplexes a plurality of input nodes to an output node, a winning node from a plurality of lower level nodes, obtaining first parameters provided from the winning node, the first parameters being in association with the winning node, determining second parameters in association with the present node at least partially based on the first parameters, and providing the second parameters in association with the present node to an upper level node in the node hierarchy for scheduling at the upper level node.

To determine the second parameters in association with the present node, in an embodiment, the method includes using the first parameters to look up an entry in a lookup table that stores the second parameters in association with the first parameters. In an example, the method includes using the first parameters to look up the entry in one of a plurality of predefined lookup tables. In another example, the method includes using the first parameters to look up the entry in a configurable lookup table.

To obtain the first parameters provided from the winning node, the method includes obtaining the first parameters as a function of traffic scheduling at the winning node.

In an embodiment, the node hierarchy multiplexes a plurality of ingress ports of a network system to the output node. In another embodiment, the node hierarchy multiplexes a plurality of input nodes to an egress port of the network system. In another embodiment, the node hierarchy multiplexes a plurality of packet queues to the output node.

To determine the second parameters, in an example, the method includes determining an eligibility parameter of the present node based on an eligibility parameter of the winning node. In another example, the method includes determining the second parameters in association with the present node at least partially based on the first parameters that include propagated priorities of the lower level nodes. In another example, the method includes determining the second parameters in association with the present node based on the first parameters and internal parameters of the present node. In another example, the method includes determining the second parameters in association with the present node based on the first parameters and a minimum token bucket parameter and a maximum token bucket parameter of the present node.

Aspects of the disclosure provide a network system. The network system includes a node hierarchy, a scheduling module, and a scheduling parameter controller module. The node hierarchy is configured to multiplex a plurality of input nodes to an output node. The scheduling module is configured to select, at a present node within the node hierarchy, a winning node from a plurality of lower level nodes to be forwarded to an upper level node to the present node. The scheduling parameter controller module is configured to obtain first parameters provided from the winning node, the first parameters being in association with the winning node, determine second parameters in association with the present node at least partially based on the first parameters, and provide the second parameters in association with the present node to an upper level node in the node hierarchy for scheduling at the upper level node.

Aspects of the disclosure provide a non-transitory computer readable medium storing program instructions for causing a processor to execute operations for network traffic scheduling. The operations include selecting, at a present node within a node hierarchy that multiplexes a plurality of input nodes to an output node, a winning node from a plurality of lower level nodes, obtaining first parameters provided from the winning node, the first parameters being in association with the winning node, determining second parameters in association with the present node at least partially based on the first parameters, and providing the second parameters in association with the present node to an upper level node in the node hierarchy for scheduling at the upper level node.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
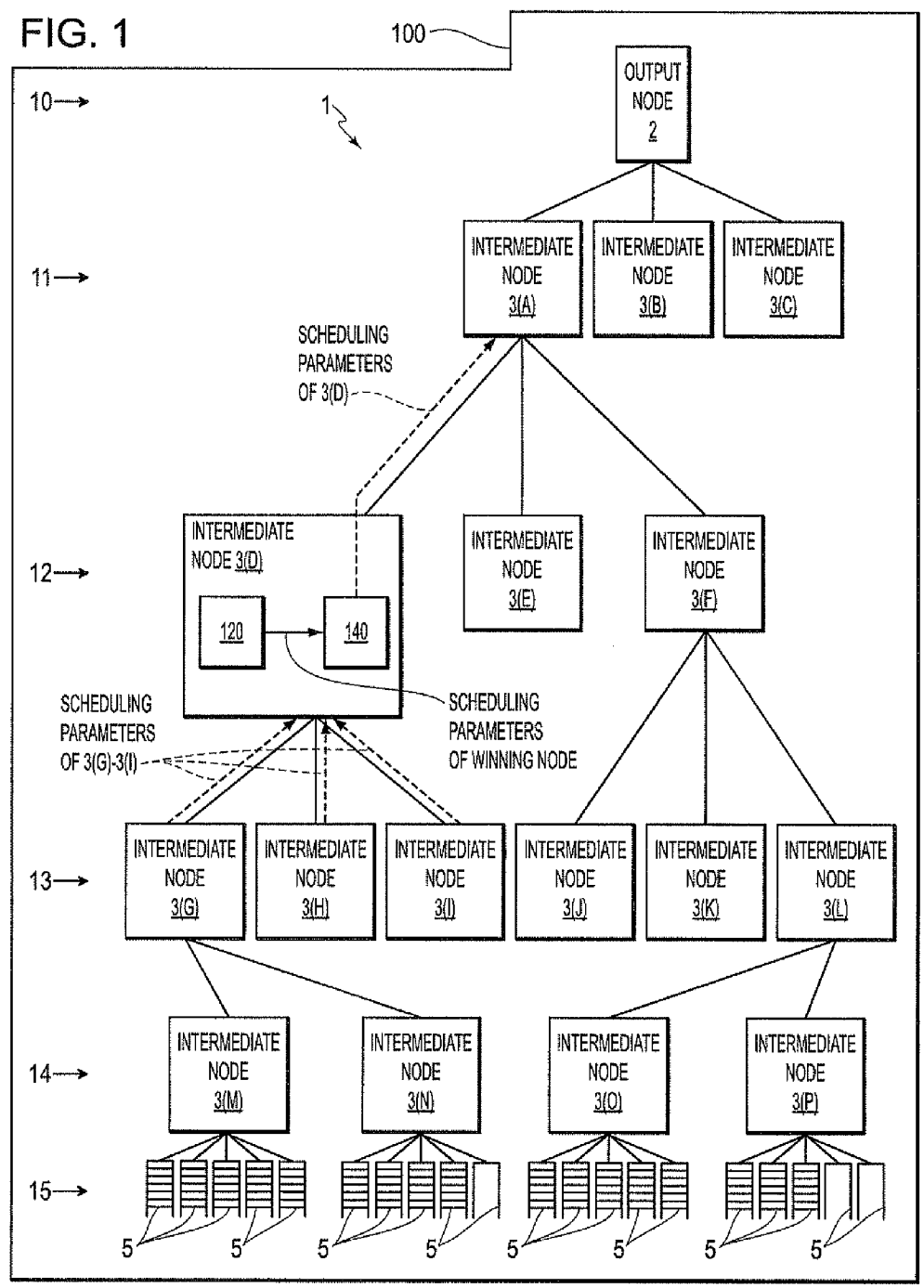
FIG. 1 is a schematic diagram disclosing a logical hierarchy of a network traffic scheduler according to one embodiment.

FIG. 1 is a schematic diagram disclosing a network traffic scheduler 1 in a network system 100 according to an embodiment of the disclosure. The network traffic scheduler 1 schedules network traffic according to a node hierarchy. The node hierarchy includes a plurality of input nodes 5 to receive network traffic, an output node 2 to output network traffic, and a plurality of intermediate nodes 3(A)-3(P) to shape network traffic.

The network system 100 can be any suitable network system. In an example, the network system 100 is a data center that includes top of rack (TOR) switches and aggregation switches. The TOR switches is coupled to various servers, drives, central processing units (CPUs), and the like, and the aggregation switches aggregate traffic from the TOR switches and provide to a core switch, for example.

In another example, the network system 100 is a switching device, such as a router, a network switch, and the like. The switching device includes a plurality of ingress ports, one or more network processors, a switch fabric and a plurality of egress ports. The ingress ports are configured to receive network traffic. The network processors are configured to process the network traffic. The switch fabric is configured to switch the network traffic. The egress ports are configured to output the network traffic.

In another example, the network system 100 is implemented on a single integrated circuit (IC) chip. The IC chip includes a plurality of input/output (I/O) pins that can be configured to receive network traffic and can be configured to output network traffic. The IC chip also includes a network processor to process the received network traffic and direct the network traffic to the suitable I/O pins.

Further, according to an aspect of the disclosure, the network traffic scheduler 1 can be arranged to manage network traffic at different portions of the network system 100, such as ingress traffic management, egress traffic management, and the like.

The network traffic scheduler 1 is configured to manage network traffic according to the node hierarchy. The nodes in the node hierarchy are arranged at a plurality of hierarchy levels. In the FIG. 1 example, the node hierarchy has an upside down tree configuration that the output node 2 is the root of the tree configuration, and the input nodes 5 are the leaves of the tree configuration. Specifically, the input nodes 5 are arranged on an input level 15 that is the lowest level of the node hierarchy, the output node 2 is provided on an output level 10 that is the highest level of the node hierarchy, and the intermediate nodes 3(A)-3(P) are arranged on intermediate levels 11-14 that between the input level 15 and the output level 10. Each of the input nodes 5 and the intermediate nodes 3(A)-3(P) is connected to a single upper level node that has a higher hierarchy level, and each of the output node 2 and the intermediate nodes 3(A)-3(P) is connected to at least a lower level node that has a lower hierarchy level.

In an embodiment, each input node 5 corresponds to a queue for storing data that is associated with a data source or a data recipient, such as a user or a user-specific service. The data can be individual data packets or datagrams, such as IP packets, ATM frames, Frame Relay Protocol data units (PDU), Ethernet packets or any other packet switched data. Further, in an embodiment, several individual data packets can be grouped together in packages for easier handling. In other words, data is selected for dequeuing by the network traffic scheduler 1 one data unit at a time, where each data unit can comprise a single data packet or each data unit can be a package including several data packets.

While the hierarchy is here shown with input nodes all being provided on the same input level 15, the hierarchy could also be arranged with inputs provided at different levels 11-15 under the output level 10.

Regardless of where the input nodes 5 are provided, a plurality of intermediate nodes 3 are provided between the input nodes 5 and the output node 2 to achieve scheduling and shaping of data.

The node hierarchy is shown to illustrate the selection process where one of the input nodes 5 is selected to supply data to the output node 2 of the network traffic scheduler 1. In an embodiment, the nodes in the node hierarchy correspond to physical components of the network system 100. In another embodiment, there are no physical components corresponding to the nodes in the hierarchy; instead the node hierarchy can be implemented using software and/or hardware. For example, the node hierarchy is implemented as a network processor, application-specific integrated circuit (ASIC), field-programmable gate array (FPGA) or central processing unit (CPU) executing software instructions.

According to an aspect of the disclosure, the network traffic scheduler 1 is configured to provide a desired connectivity service, e.g., by ensuring that the bandwidths comply with service level agreements of attached users. The services level agreements specify quality of service parameters such as minimum bandwidth, maximum bandwidth, latency, jitter and loss probability for traffic received from or transmitted to a network user. The service level agreements can differ between users.

Data made available on the input nodes 5 are made available for scheduling and dequeuing, whereby a selected data unit is dequeued from its input node 5 and transferred to the output node 2. The selection is performed using the intermediate nodes 3(A) to 3(P) of the node hierarchy to control the dequeuing of data as determined by the network traffic scheduler 1. In an embodiment, each of the intermediate nodes 3(A) to 3(P) and the output node 2 selects one of the lower level nodes as a winning node, and the operation of the nodes in the node hierarchy collectively select one winning input node 5 that the intermediate nodes between the winning input node 5 to the output node 2 form a path of winning intermediate nodes. Thus, a data unit at the winning input node is dequeued and transferred to the output node 2. While the node hierarchy in FIG. 1 is disclosed using six levels 10-15, any number of levels can be used, as long as there are intermediate nodes (e.g., 3(A) to 3(P)) provided between the input nodes 5 and the output node 2.

According to an aspect of the disclosure, each node in the node hierarchy includes various scheduling parameters for scheduling control, and some of the scheduling parameters at a node are dynamically adjusted based on the winning node of the lower level nodes. In the FIG. 1 example, the intermediate node 3(D) includes a scheduling module 120, a scheduling parameter update module 140. The scheduling module 120 selects one of the lower level intermediate nodes 3(G)-3(I) as a wining node, the scheduling parameter update module 140 updates the scheduling parameters of the intermediate node 3(D) based on the scheduling parameters of the winning node. In an example, when the intermediate node 3(G) is the winning node, the scheduling parameter update module 140 updates the scheduling parameters of the intermediate node 3(D) based on the scheduling parameters of the intermediate node 3(G). Then, the scheduling parameters of the intermediate node 3(D) are provided to an upper level node, such as the intermediate node 3(A), for scheduling at the upper level node.

It is noted that the scheduling parameter update module 140 can use any suitable technique to determine the scheduling parameters of the intermediate node 3(D) based on the scheduling parameters of the lower level winning node, such as one or more look-up tables, an algorithm, equations, content addressable memory (CAM), and the like.

According to an aspect of the disclosure, look-up tables provide flexibility for determining the scheduling parameters of the intermediate node 3(D) based on the scheduling parameters of the lower level winning node. In an example, a look-up table includes entries corresponding to every combination of scheduling parameters of the lower level winning node, and then each entry stores the scheduling parameters of the intermediate node 3(D) corresponding to the combination of the scheduling parameters of the lower level winning node. The look-up table can be used to implement any relationship between the scheduling parameters of the intermediate node 3(D) and the scheduling parameters of the lower level winning node. In some examples, the relationship can be implemented using other techniques, such as equations, algorithm, and the like.

In addition, in an example, the intermediate node 3(D) includes multiple look-up tables that respectively correspond to different relationships between the scheduling parameters of the intermediate node 3(D) and the scheduling parameters of the lower level winning node. The intermediate node 3(D) can select one of the look-up tables of a desired relationship. The intermediate node 3(D) can select the look-up table during an initialization procedure, or can dynamically change to a different look-up table, for example, when the network traffic scenario changes.

In an embodiment, the intermediate nodes 3(A)-3(P) use a same look-up table. In another embodiment, the intermediate nodes in the same hierarchy level use a same look-up table, and the intermediate nodes in different hierarchy use different look-up tables. In another embodiment, the intermediate nodes 3(A)-3(P) independently select suitable lookup table during operation.

Figure 2:
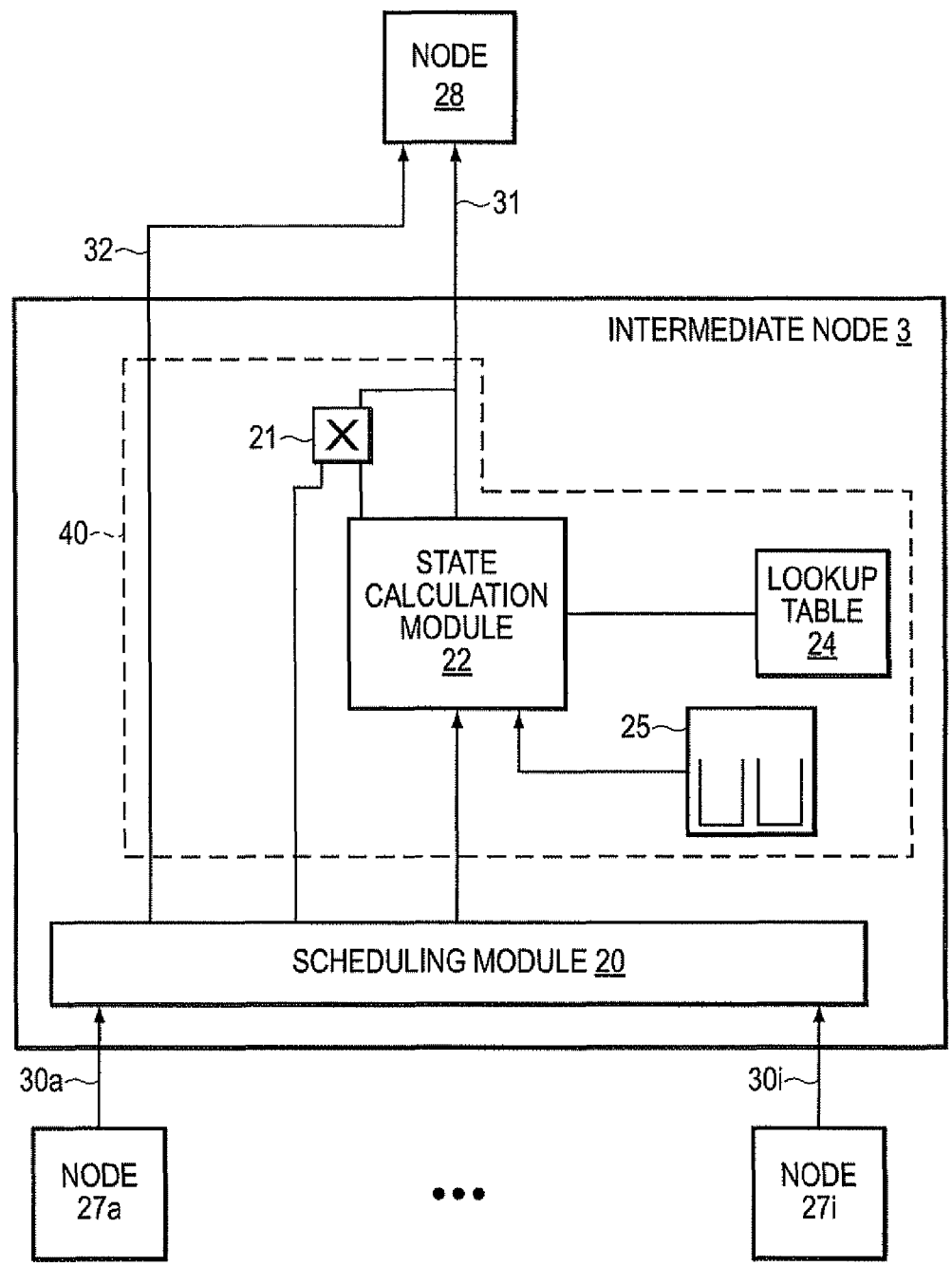
FIG. 2 is a schematic diagram disclosing logical components of an intermediate node of the logical hierarchy of FIG. 1.

FIG. 2 is a schematic diagram disclosing logical components of an intermediate node 3 of the node hierarchy of FIG. 1. The intermediate node 3 is connected to at least one lower level node 27a-i, and one upper level node 28. The lower level node/nodes can be input nodes 5 or other intermediate nodes 3. The upper level node 28 can be the output node 2 or other intermediate nodes 3.

The intermediate node 3 includes a scheduling module 20 arranged to select one of the at least one lower level node 27a-i as a winning node to be forwarded to the upper level node 28, and a scheduling parameter update module 40 updates scheduling parameters in association with the intermediate node 3.

To make the selection, the intermediate node 3 can utilize one or more of the following scheduling parameters 30a-i of the lower level nodes 27a-i and/or internal parameters of the intermediate node 3.

One parameter is an eligibility parameter which is a flag associated with each lower level node 27a-i. The eligibility parameter indicates whether the lower level node 27a-i is allowed to be selected or not.

Another parameter is scheduling priority associated with each lower level node 27a-i. Scheduling priority can be used to handle delay sensitive and high priority traffic. In one embodiment, three bits are used for scheduling priority, which gives eight possible values for the scheduling priority. Other number of scheduling priorities can also be used. In an example, configuring scheduling priorities for nodes all the way through the node hierarchy is one way to handle delay sensitive traffic.

Another parameter is propagated priority, also associated with each lower level node 27a-i. As suggested by the name, propagated priority is propagated to the upper level node, from which it is propagated further. Propagated priority can be used to handle delay sensitive traffic in a user oriented scheduling hierarchy. In an example, a high propagated priority of an input node propagates from the input node up the node hierarchy to an intermediate node just below the output node. Then, according to the node hierarchy, the traffic at the input node is scheduled with relatively small delay.

Moreover, in an embodiment, internal state parameters are used by the scheduling module 20 to select a winner from the lower level nodes 27a-i.

The scheduling module 20 can use any suitable scheduling technique, such as round robin, Deficit Weighted Round Robin (DWRR), and the like, to perform scheduling based on various parameters.

In an example, a round robin scheme can be used to achieve a degree of fairness between the lower level nodes 27a-i. In an embodiment, the round robin scheme is used as default at all levels and priorities. In another embodiment, when nodes have significantly different packet sizes, DWRR is used to reduce jitter.

DWRR is an implementation of WFQ (weighted fair queuing). It provides fair sharing of bandwidth in a work conserving manner and permits configuration of bandwidth ratios by means of weights. DWRR is particularly useful in an oversubscribed scenario. In an oversubscribed scenario the demand for bandwidth is higher than the available bandwidth at least some of the time.

Unlike the bandwidth resulting from shaping, e.g., implemented using token buckets as described below, the bandwidth from DWRR scheduling can vary over time, even if accurate ratios are maintained. Oversubscription scenarios are based on statistical multiplexing and this creates congestion conditions that vary in their length and severity. However, the algorithm results in that over a long period of time, the bandwidth ratios of the nodes that are competing for the limited bandwidth resource are accurate.

In both round robin and DWRR, an internal state is kept by the scheduling module 20, e.g., to know which lower level node 27a-i was last served.

Once a winning lower level node has been selected by the scheduling module 20, the scheduling parameter update module 40 determines and updates the scheduling parameters of the intermediate node 3 based on the scheduling parameters of the winning lower level node. In the FIG. 2 example, the scheduling parameter update module 40 includes a state calculation module 22, a lookup table 24, an eligibility combiner 21, and internal state parameter module 25. These elements are coupled together as shown in FIG. 2.

The state calculation module 22 obtains a set of input parameters, wherein the input parameters comprise scheduling parameters being associated with the winning node, such as the eligibility, scheduling priority, propagated priority, and the like. In addition, in an example, the internal state parameter module 25 provides internal state parameters of the intermediate node 3 to the state calculation module 22.

In addition, intermediate nodes 3 will prefer lower level nodes with higher propagated priority to child nodes with lower propagated priority queues. This enables delay sensitive data to be served faster. The manner in which propagated priority is propagated is optionally configurable per node or per level. The use of lookup tables as is explained in more detail below.

The internal state parameters 25 can for example be dual token bucket data 25 for minimum and maximum shaping in accordance with service level agreements. For example, a minimum committed bandwidth can be handled using a min token bucket and is referred to as min bandwidth, e.g., represented by one bit. An excess bandwidth can be handled by a max token bucket and is referred to as max bandwidth, e.g., represented by one bit. The intermediate node thus uses the min token bucket for bandwidth guarantee and the max token bucket the excess bandwidth rate shaping.

Min token bucket is used to control the guaranteed bandwidth. This bandwidth is provided under any condition unless it is oversubscribed. Max token bucket is used to limit a specific node to a specific maximum bandwidth. This is required in case other nodes do not have data, but still preventing a lower level node from using all the available bandwidth in violation of its service level agreement, or because it is not desirable that it consumes the higher intermediate node bandwidth (tokens) that will be required at a later time for more important traffic. Min conforming nodes are preferred (have strict priority) over max conforming nodes. At each intermediate node, all min nodes (nodes with conforming min token bucket) are served before any max node (node with non-conforming min token bucket and conforming max token bucket). This scheme ensures that min bandwidth is provided before any max bandwidth.

Using the input parameters, the state calculation module 22 obtains output parameters 31 by finding a matching row in a lookup table 24. The input parameters are used as a key or address to find the output parameters 31 to use. The lookup table 24 is structured such that it is applicable for all combinations of input parameters.

For example, if the input parameters for state calculation are propagated priority (three bits), min token bucket (one bit) and max token bucket (one bit), there are five bits for the input parameters, which results in 2^5=32 possible combinations of input parameters. The lookup table 24 can then use the input parameters as table key and may in this example have 32 rows to cover all possible values of input parameters, where output parameters are provided in each row. Optionally, associative memory with wildcards can be used to reduce the number of rows and still cover all possible values of input parameters.

Output parameters may for example include propagated priority (three bits), scheduled priority (three bits) and eligibility (one bit). Optionally, two bits can be output to update min and max token buckets for the upper level node, respectively. In this example, the output parameters thus consist of seven or nine bits.

It is to be noted that the number of bits for each parameter presented herein are mere examples and can, in each implementation, be freely selected for each parameter to be any suitable number of bits.

The lookup table 24 thus defines the output parameters for each value of input parameters, in effect providing a flexible way of defining a function f for output parameters=f(input parameters).

At least some of the output parameters 31 provided to the upper level node 28 are used as input parameters for the upper level node 28, unless the upper level node is the output node 2.

One parameter of the output parameters 31 can be the eligibility parameter. The eligibility parameter can be calculated by the eligibility combiner 21, In an example, the eligibility combiner 21 combines an eligibility parameter from the matching row of the lookup table and an input eligibility parameter of the winning node to determine the eligibility parameter for output. In an example, the eligibility combiner 21 performs an AND operation, in a multiplier or using AND gate, of the eligibility from the matching row of the lookup table and the input eligibility parameter of the winning node.

An identity 32 of the winning node is also provided to the upper level node. The winning node identity of each level is propagated upwards in the hierarchy in this way, such that eventually a winning node of the entire hierarchy is determined.

Figure 3:
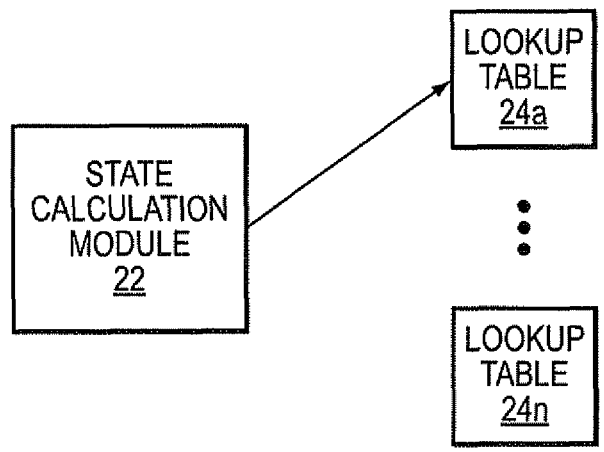
FIG. 3 is a schematic diagram illustrating how a lookup table can be selected by a state calculation module of the intermediate node of FIG. 2.

FIG. 3 is a schematic diagram illustrating how the lookup table is selected by the state calculation module 22 of the intermediate node 3 of FIG. 2. The intermediate node 3 comprises a plurality of predefined lookup tables 24*a-n*. Each such predefined lookup table thus defines a function for state calculation. Each intermediate node 3 is configured to select an active one of the predefined lookup tables 24*a-n*. The selected lookup table is used when determining the output parameters. This configuration can be completely static. Alternatively, it may be configured at boot time or reconfigured dynamically on demand, potentially after each data unit dequeuing. The dynamic selection can be controlled by an external control device. Optionally, instead of selecting a desired lookup table, the content of the lookup table can be altered to effect the desired function. In other words, in such an embodiment, the lookup table is a freely configurable table.

By means of this selectable behavior of the state calculation, a completely new level of flexibility is provided. The selection of function using the lookup tables can be performed uniformly for all intermediate nodes, separately for each level in the hierarchy or separately for each individual intermediate node.

Figure 4:
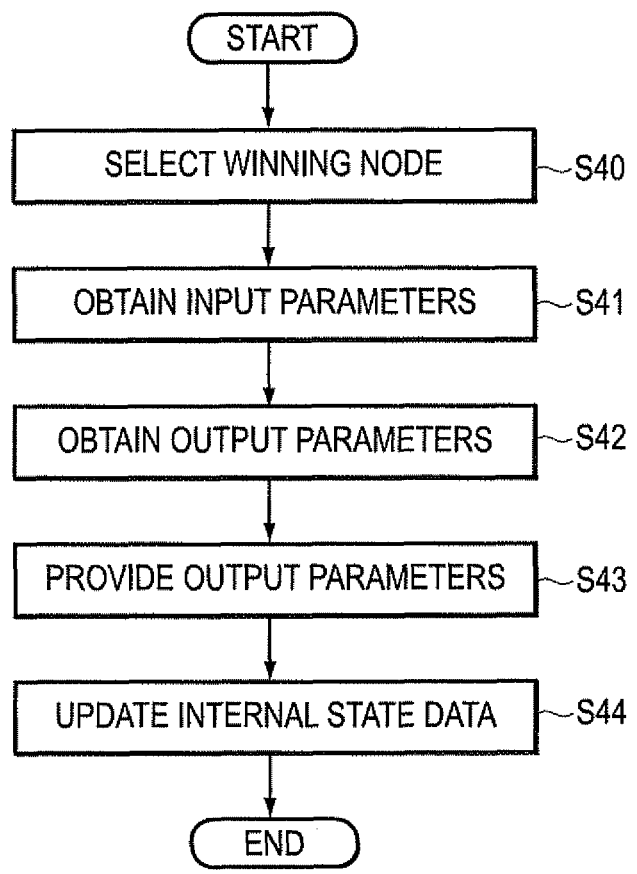
FIG. 4 is a flow chart illustrating a method performed in the intermediate node of FIG. 2.

FIG. 4 is a flow chart illustrating a method performed in the intermediate node of FIG. 2. The method can be performed in each of the intermediate nodes of FIG. 1 and can be implemented in hardware and/or software.

At S40, one of the lower level nodes is selected as a winning node to be forwarded to the upper level node. This selection is performed as described above with reference to the scheduling module 20.

At S41, a set of input parameters are obtained, as described above with reference to the state calculation module 22. The input parameters can comprise input data, such as scheduling parameters, being associated with the winning node and optionally internal state data of the respective intermediate node.

At S42, output parameters are obtained by finding a matching row in the lookup table using the input parameters as a key, as described above.

At S43, the output parameters obtained at S42 are provided to the upper level node.

At S44, the internal state data, such as the min token bucket and max token bucket are updated. This can occur as a response to selection of winning input node in the entire network traffic scheduler, or when a winning lower level node is selected.

Figure 5:
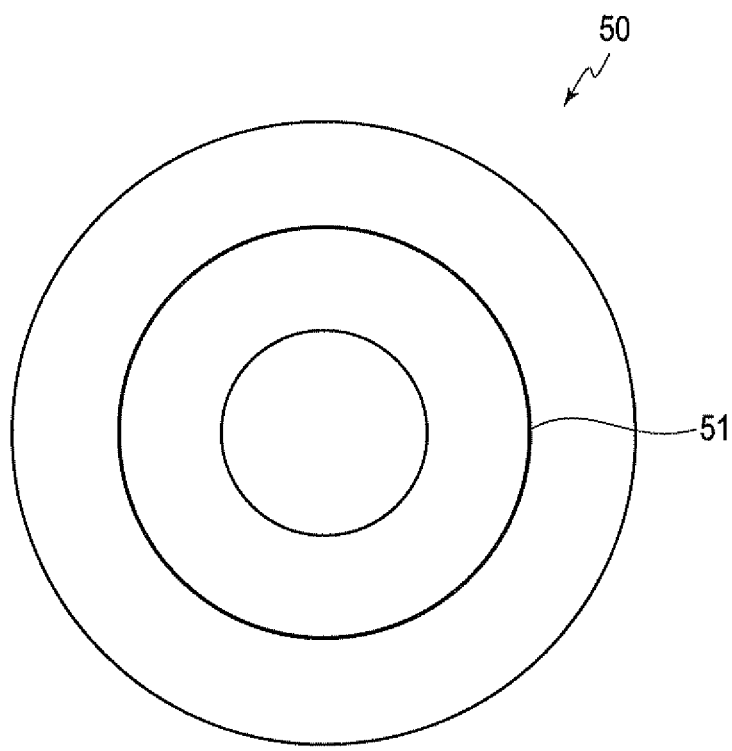
FIG. 5 shows one example of a computer program product including computer readable means.

FIG. 5 shows one example of a computer program product 60 including computer readable means. On this computer readable means a computer program 51 can be stored, which computer program can cause a controller to execute a method according to embodiments described herein. In this example, the computer program product 50 is an optical disc, such as a CD (compact disc) or a DVD (digital versatile disc) or a Blu-Ray disc. As explained above, the computer program product could also be embodied as a memory of the network traffic scheduler. While the computer program 51 is here schematically shown as a track on the depicted optical disk, the computer program 51 can be stored in any way which is suitable for the computer program product 50.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for network traffic scheduling, comprising:
   selecting, at a first node within a node hierarchy that multiplexes a plurality of input nodes to a single output node, a second node from a plurality of first level nodes, the node hierarchy including at least two or more intermediate node levels between the single output node and the input nodes, at least one node from each intermediate node level receiving parameters from at least three lower level nodes;
   obtaining first parameters provided from the second node, the first parameters being in association with the second node, the first parameters including at least a first eligibility parameter that indicates whether the second node is allowed to be selected or not;
   combining a value of the first eligibility parameter from the second node and a value of a second eligibility parameter from the first node to generate a third eligibility parameter that is provided to a third node above the first node in the node hierarchy;
   determining second parameters in association with the first node at least partially based on the first parameters; and
   providing the second parameters in association with the first node to a second level node in the node hierarchy for scheduling at the second level node.

2. The method according to claim 1, wherein determining the second parameters in association with the first node at least partially based on the first parameters further comprises:
   using the first parameters to look up an entry in a lookup table that stores the second parameters in association with the first parameters.

3. The method according to claim 2, wherein using the first parameters to look up the entry in the lookup table further comprises at least one of:
   using the first parameters to look up the entry in one of a plurality of pre-defined lookup tables; and
   using the first parameters to look up the entry in a configurable lookup table.

4. The method according to claim 1, wherein obtaining the first parameters provided from the second node further comprises:
   obtaining the first parameters as a function of traffic scheduling at the second node.

5. The method according to claim 1, wherein selecting, at the first node within the node hierarchy that multiplexes the plurality of input nodes to the output node, the second node from the plurality of first level nodes further comprises at least one of:
   selecting at the first node within the node hierarchy that multiplexes a plurality of ingress ports of a network system to the output node, the second node from the plurality of first level nodes;
   selecting at the first node within the node hierarchy that multiplexes a plurality of input nodes to an egress port of a network system, the second node from the plurality of first level nodes; and
   selecting at the first node within the node hierarchy that multiplexes a plurality of packet queues to the output node, the second node from the plurality of first level nodes.

6. The method according to claim 1, wherein determining the second parameters in association with the first node at least partially based on the first parameters further comprises:
   determining an eligibility parameter of the first node based on an eligibility parameter of the second node.

7. The method according to claim 1, wherein determining the second parameters in association with the first node at least partially based on the first parameters further comprises:
   determining the second parameters in association with the first node at least partially based on the first parameters that include propagated priorities of the first level nodes.

8. The method according claim 1, wherein determining the second parameters in association with the first node at least partially based on the first parameters further comprises:
   determining the second parameters in association with the first node based on the first parameters and internal parameters of the first node.

9. The method according to claim 8, wherein determining the second parameters in association with the first node based on the first parameters and the internal parameters of the first node further comprises:
   determining the second parameters in association with the first node based on the first parameters and a minimum token bucket parameter and a maximum token bucket parameter of the first node.

10. The method according to claim 8, further comprising:
    updating the internal parameters of the first node when the second node is selected.

11. The method according to claim 1, wherein the first node is a present node, the second node is a winning node, the output node has the highest level in the node hierarchy, the first level nodes are lower level nodes than the present node in the node hierarchy, and the second level node is an upper level node than the present node in the node hierarchy.

12. The method according to claim 1, wherein combining a value of the first eligibility parameter from the second node and a value of a second eligibility parameter from the first node further comprises:
    performing a logical AND operation between an integer value of the first eligibility parameter and an integer value the second eligibility parameter to generate the third eligibility parameter.

13. A network system, comprising:
    a node hierarchy configured to multiplex a plurality of input nodes to a single output node and include at least two or more intermediate node levels between the single output node and the input nodes, at least one node from each intermediate node level receiving parameters from at least three lower level nodes;
    a scheduling module configured to select, at a first node within the node hierarchy, a second node from a plurality of first level nodes; and
    a scheduling parameter controller module configured to obtain first parameters provided from the second node, the first parameters being in association with the second node, the first parameters including at least a first eligibility parameter that indicates whether the second node is allowed to be selected or not, combine a value of the first eligibility parameter from the second node and a value of a second eligibility parameter from the first node to generate a third eligibility parameter that is provided to a third node above the first node in the node hierarchy, determine second parameters in association with the first node at least partially based on the first parameters, and provide the second parameters in association with the first node to a second level node in the node hierarchy for scheduling at the second level node.

14. The network system according to claim 13, wherein the scheduling parameter controller module comprises a lookup table, and the scheduling parameter controller module is configured to use the first parameters to look up an entry in the lookup table that stores the second parameters in association with the first parameters.

15. The network system according to claim 14, wherein the scheduling parameter controller module comprises a plurality of pre-defined lookup tables, and the scheduling parameter controller module selects one of the pre-defined lookup tables as the lookup table to perform the look up operation.

16. The network system according to claim 14, wherein the scheduling parameter controller module comprises a configurable lookup table.

17. The network system according to claim 13, wherein the input nodes of the node hierarchy correspond to ingress ports of the network system.

18. The network system according to claim 13, wherein the output node of the node hierarchy corresponds to an egress port of the network system.

19. The network system according to claim 13, wherein the input nodes of the node hierarchy correspond to packet queues.

20. The network system according to claim 13, wherein the scheduling parameter controller module is configured to determine the second parameters in association with the first node based on the first parameters and internal parameters of the first node.

21. The network system according to claim 20, wherein the scheduling parameter controller module is configured to determine the second parameters in association with the first node based on the first parameters and a minimum token bucket parameter and a maximum token bucket parameter of the first node.

22. The network system according to claim 13, wherein the first node is a present node, the second node is a winning node, the output node has the highest level in the node hierarchy, the first level nodes are lower level nodes than the present node in the node hierarchy, and the second level node is an upper level node than the present node in the node hierarchy.

23. A non-transitory computer readable medium storing program instructions for causing a processor to execute operations for network traffic scheduling, the operations comprising:
   selecting, at a present node within a node hierarchy that multiplexes a plurality of input nodes to a single output node, a winning node from a plurality of lower level nodes, and the node hierarchy including at least two or more intermediate node levels between the single output node and the input nodes, at least one node from each intermediate node level receiving parameters from at least three lower level nodes;
   obtaining first parameters provided from the winning node, the first parameters being in association with the winning node, the first parameters including at least a first eligibility parameter that indicates whether the wining node is allowed to be selected or not;
   combining a value of the first eligibility parameter from the winning node and a value of a second eligibility parameter from the present node to generate a third eligibility parameter that is provided to another node above the present node in the node hierarchy;
   determining second parameters in association with the present node at least partially based on the first parameters; and
   providing the second parameters in association with the present node to an upper level node in the node hierarchy for scheduling at the upper level node.

* * * * *